United States Patent
Oz et al.

(10) Patent No.: US 8,169,903 B2
(45) Date of Patent: *May 1, 2012

(54) MANAGING TRAFFIC WITHIN AND BETWEEN VIRTUAL PRIVATE NETWORKS WHEN USING A SESSION BORDER CONTROLLER

(75) Inventors: Doron Oz, Even Yehuda (IL); Michel Khouderchah, Cupertino, CA (US); Chandrasekar Krishnamurthy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1028 days.

This patent is subject to a terminal disclaimer.

(21) Appl. No.: 11/370,469

(22) Filed: Mar. 7, 2006

(65) Prior Publication Data

US 2007/0211716 A1    Sep. 13, 2007

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04J 3/16* | (2006.01) |
| *H04J 3/22* | (2006.01) |
| *H04L 1/00* | (2006.01) |
| *H04L 12/26* | (2006.01) |
| *H04L 12/28* | (2006.01) |
| *H04L 12/56* | (2006.01) |
| *G06F 15/177* | (2006.01) |
| *G06F 15/16* | (2006.01) |

(52) U.S. Cl. ...... 370/231; 370/236; 370/395.2; 370/395.31; 370/395.53; 370/401; 370/409; 370/467; 370/469; 709/220; 709/230; 709/236

(58) Field of Classification Search .......... 370/392, 370/235, 395, 409, 397
See application file for complete search history.

(56) References Cited

U.S. PATENT DOCUMENTS

| | | | |
|---|---|---|---|
| 6,693,878 B1* | 2/2004 | Daruwalla et al. | 370/235 |
| 7,073,053 B1 | 7/2006 | Oz | |
| 7,099,287 B1 | 8/2006 | Oz | |
| 7,110,355 B1 | 9/2006 | Oz | |
| 7,317,681 B1 | 1/2008 | Oz | |
| 7,386,711 B1 | 6/2008 | Oz | |
| 7,388,830 B1 | 6/2008 | Oz | |
| 7,447,203 B2 | 11/2008 | Chen et al. | |
| 7,486,684 B2* | 2/2009 | Chu et al. | 370/401 |
| 7,502,320 B2 | 3/2009 | Oran | |
| 7,522,595 B2 | 4/2009 | Ben-Dvora | |
| 7,787,462 B2 | 8/2010 | Altshuler | |

(Continued)

OTHER PUBLICATIONS

Kaeo, Designing Network Security, Oct. 30, 2003, Cisco Press, Second Edition, 5, 8.*

(Continued)

*Primary Examiner* — Nishant B Divecha

(74) *Attorney, Agent, or Firm* — Stolowitz Ford Cowger LLP

(57) ABSTRACT

Methods and devices for managing traffic are described. Traffic from a source in a virtual private network (VPN) is received. The traffic is directed to a virtual interface that is designated to receive traffic from the VPN. The virtual interface is configured to associate the traffic with an identifier that uniquely identifies the VPN to a session border controller (SBC). The SBC can use the identifier to determine whether the source and the destination of the traffic are in the same VPN.

15 Claims, 7 Drawing Sheets

U.S. PATENT DOCUMENTS

| | | | |
|---|---|---|---|
| 7,787,478 | B2 | 8/2010 | Khouderchah |
| 7,801,062 | B2 | 9/2010 | Oz et al. |
| 2004/0165600 | A1 | 8/2004 | Lee |
| 2005/0147057 | A1 | 7/2005 | LaDue |
| 2005/0157664 | A1 | 7/2005 | Baum et al. |
| 2005/0198412 | A1 | 9/2005 | Pederson et al. |
| 2005/0254470 | A1 | 11/2005 | Yashar |
| 2006/0046714 | A1 | 3/2006 | Kalavade |
| 2007/0019619 | A1* | 1/2007 | Foster et al. ............ 370/352 |
| 2007/0071010 | A1* | 3/2007 | Iyer et al. ............ 370/395.53 |
| 2007/0116043 | A1 | 5/2007 | MeLampy |
| 2007/0201481 | A1 | 8/2007 | Bhatia et al. |
| 2007/0206490 | A1 | 9/2007 | Altshuler et al. |
| 2007/0211716 | A1 | 9/2007 | Oz et al. |
| 2007/0248110 | A1 | 10/2007 | Oz |
| 2007/0261110 | A1 | 11/2007 | Oz |
| 2007/0280132 | A1 | 12/2007 | Oz |
| 2007/0291752 | A1 | 12/2007 | Ben-Dvora |
| 2009/0262723 | A1 | 10/2009 | Pelletier et al. |

OTHER PUBLICATIONS

Fox et al., RFC 2685, Virtual Private Networks Identifier, Network Working Group, 2.*

RFC 2685, Fox et al, VPN identifier, Sep. 1999.*

Prosecution history for U.S. Appl. No. 11/370,294, filed Mar. 7, 2006.

Newport Networks, "Newport Networks Enhances Session Border Control with Industry-First Geographic Resilience and Link Aggregation, Release 2.0 of Carrier-class Solution", Jun. 1, 2001.

Acme Packet, "Acme Packet Net-Net session border controllers", 2006.

International Telecommunication Standardization Sector of ITU, "Series H: Audiovisual and Multimedia Systems", Gateway control protocol: Version 3, H.248.1; Sep. 2005.

Rosen, E., "BGP/MPLS VPNs", RFC 2547, Mar. 1999.

International Telecommunication Standardization Sector of ITU, Series H: Audiovisual and Mulitmedia Systems, Packet-based multimedia communications systems, H.323, Jul. 2003.

www.Newport-networks.com, "Newport Networks Enhances Session Border Control With Industry-First Geographic Resilience and Link Aggregation," 3 pages total, Jun. 1, 2005, www.newport-networks.com/press/press050601-geographic.html.

www.acmepacket.com, "Acme Packet Net-Net session border controls," 4 pages total, 2006, http://www.acmepacket.com/images/Ap_Net-Net_datasheet060601.pdf.

US PCT Office, "International Search Report", PCT/US07/61613, Dec. 20, 2007, 2 pages and Written Opinion of the International Searching Authority, PCT/US07/61613, mail date Dec. 20, 2007, 4 pages.

\* cited by examiner

MANAGING TRAFFIC WITHIN AND BETWEEN VIRTUAL PRIVATE NETWORKS WHEN USING A SESSION BORDER CONTROLLER

RELATED APPLICATION

This Application is related to U.S. patent application Ser. No. 11/370,294 by M. Khouderchah et al., filed on Mar. 7, 2006, entitled "Managing Traffic Within and Between Virtual Private Networks When Using a Session Border Controller,", assigned to the assignee of the present invention, and hereby incorporated by reference in its entirety.

TECHNICAL FIELD

Embodiments of the present invention pertain to communication networks, and virtual private networks in particular.

BACKGROUND ART

A virtual private network (VPN) is an example of a private communication network. A VPN emulates a private, Internet Protocol (IP) network using shared or public network infrastructures such as the Internet. One type of VPN is implemented by configuring network devices (e.g., switches and routers) to establish a private, encrypted "tunnel" over a public network in order to secure VPN traffic against public access.

A VPN may encompass a number of virtual local area networks (VLANs). A VLAN consists of a network of computers or like devices, which behave as if they are connected to the same local wire but in fact may be in different locations (e.g., in different buildings, or even in different cities). Thus, devices may be a part of the same VPN although separated by large distances. A device such as a computer or a voice-over-IP (VoIP) phone can be identified as a member of a particular VLAN using a VLAN tag prescribed according to, for example, IEEE 802.1 Q.

Session border controllers (SBCs) are used to provide services and to implement policies in VoIP communication networks. An SBC may be used, for example, to enable VoIP calls to be made to and from VPNs, from VPNs to a public switched telephone network (PSTN), or between phones that use different VoIP protocols.

An SBC may serve multiple VPNs, performing different services and implementing different policies for each. Also, the services performed and policies implemented by an SBC may depend on whether or not the traffic will remain within the VPN. Accordingly, it can be important to identify whether or not the calling and called parties are members of the same VPN and, if so, which VPN.

Currently, VLAN tags are used to associate traffic with a particular VPN. Each SBC is configured with mapping tables to map VLAN tags to VPN customer identifiers (IDs). The mapping tables are needed because VLAN tags are not globally unique, and so multiple SBCs may have different VLAN tags associated with the same VPN customer. Using the mapping tables, an SBC can determine whether the calling and called parties belong to the same VPN.

A problem with the conventional approaches is the effort needed to create and update the mapping tables on each of the SBCs in a VoIP network. The present invention provides a novel solution to this problem.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "accessing," "directing," "associating," "embedding," "forwarding" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
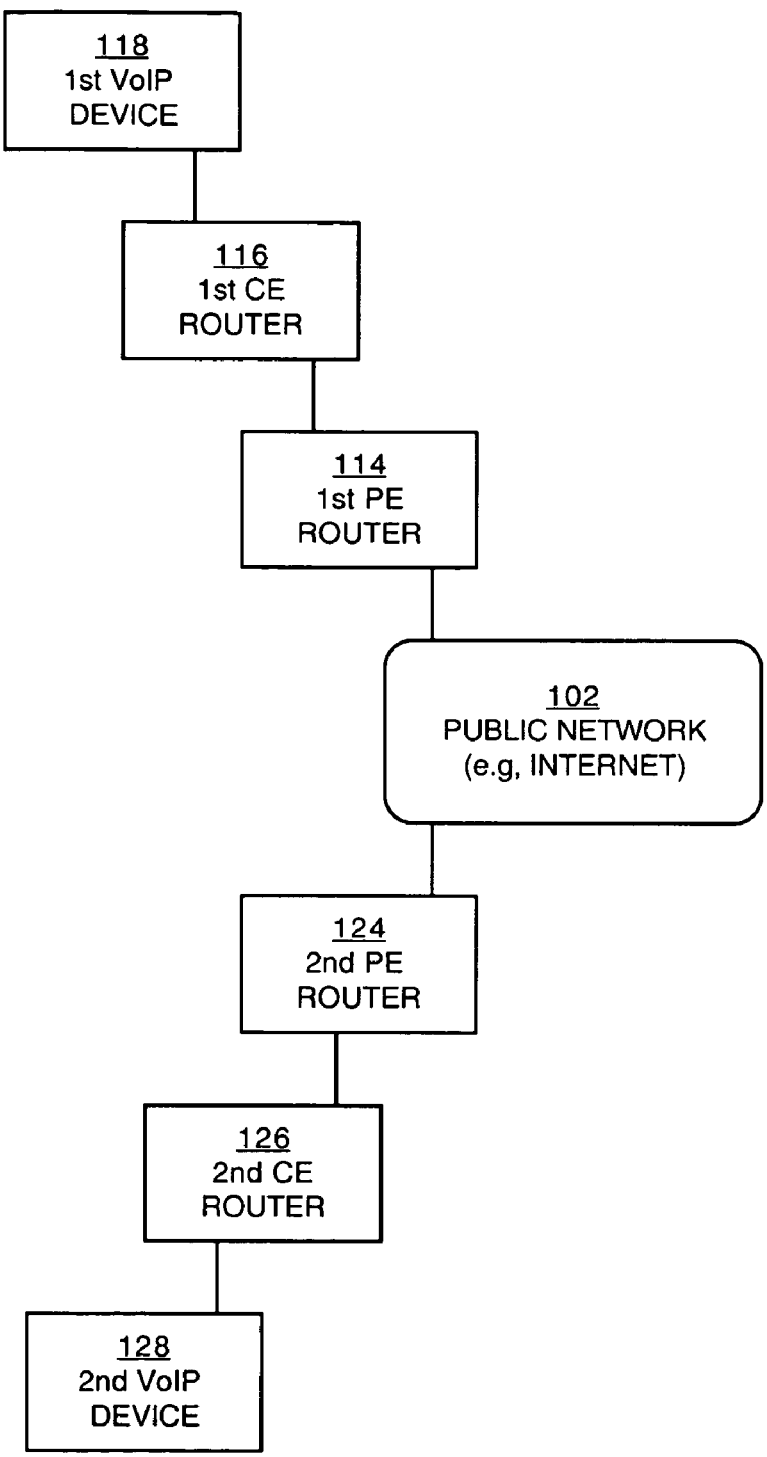
FIG. 1 is a block diagram of a network upon which embodiments in accordance with the present invention may be implemented.

FIG. 1 is a block diagram showing some of the elements of a network where embodiments in accordance with the present invention may be implemented. The example of FIG. 1 shows a first device 118 and a second device 128, each linked to a shared or public network 102, such as the Internet. In one embodiment, the devices 118 and 128 are devices that allow users to place voice-over-Internet Protocol (VoIP) calls. Although the present invention is discussed in the context of calls between VoIP devices, the present invention is not so limited. Generally speaking, traffic occurs between the devices 118 and 128, and the traffic contains media data (e.g., voice and/or video data) and also can contain signaling information.

The device 118 may be a member of one VLAN, and the device 128 may be a member of another VLAN. However, the present invention is not limited to any particular network architecture, such as VLANs, nor to any particular transport function or standard. That is, connections between devices can be accomplished using, for example, Asynchronous Transfer Mode (ATM), Transmission Control Protocol/Internet Protocol (TCP/IP), Synchronous Optical Network (SONET), Frame Relay (FR) protocol, or any other signal or connection format.

In the example of FIG. 1, a first provider edge (PE) router 114 and a first customer edge (CE) router 116 are linked to the first VoIP device 118, and a second PE router 124 and a second CE router 126 are linked to the second VoIP device 128. A PE router is, in general, a router situated as an interface between a network service provider (e.g., Internet service provider) and other network service providers. A CE router is, in general, a router situated as the interface between a customer network and a network of service providers. A PE router may not have knowledge of the type of traffic it is handling. A CE router can be used to forward traffic to a private network (e.g., a VPN) that uses private IP addressing.

The network 102 can include any number of network routing devices. One or more session border controllers (SBCS) may be implemented on any of the routers. Alternatively, one or more SBCs may be implemented on a separate device that is coupled to a router. In one embodiment, an SBC is implemented in hardware, as a linecard, for example. In another embodiment, an SBC is implemented in software. A combination of hardware and software may also be used. SBCs are described further in conjunction with the figures below.

Continuing with reference to FIG. 1, traffic from one of the devices (e.g., device 118) may encounter one or more SBCs en route to another device (e.g., device 128). There are at least two situations of particular interest to the discussion herein: 1) a situation in which devices 118 and 128 are members of the same VPN; and 2) a situation in which devices 118 and 128 are members of different VPNs. In either situation, it is important for an SBC to determine whether or not the devices 118 and 128 are members of the same VPN. It may also be important to identify which VPN the devices 118 and 128 are members of.

For example, the services or policies implemented by an SBC can depend on whether or not the devices 118 and 128 are members of the same VPN. If an SBC determines that the devices 118 and 128 are not members of the same VPN, then certain services or policies may be implemented by the SBC. On the other hand, if an SBC determines that the devices 118 and 128 are members of the same VPN, a different set of services and policies may be implemented by the SBC. In some instances, the services and policies implemented by the SBC may not be needed, and consequently the SBC may be bypassed. Bypassing an SBC can reduce processing overhead and shorten the communication path.

For example, consider an SBC that provides a protocol translation service to enable a call between two networks or devices that use different VoIP protocols. If the calling and called parties use the same VoIP protocol, the protocol translation service of the SBC is not needed. If no other SBC-implemented services or policies are needed, the call traffic may bypass the SBC.

In one embodiment, call traffic includes both a signal stream portion and a media stream portion. The signal stream includes, for example, information for call control functions, based on signaling protocols such as, but not limited to, Session Initiation Protocol (SIP), International Telecommunications Union (ITU) standard H.323 or H.248, or Media Gateway Control Protocol (MGCP). The media stream includes, for example, audio (voice) and/or video data, such as, but not limited to, RTP (Real Time Protocol) or RTCP (Real Time Control Protocol) streams for voice or video codecs. The signal and media streams are separable from each other. In general, the signal stream precedes the media stream—the signal stream is used to establish a connection between the calling and called parties, and once the connection is established, the media stream can be initiated.

Therefore, to be more specific with regard to the foregoing discussion, an SBC can receive and act on the signal stream associated with a particular call, while the media stream associated with the call either may be directed to (through) that SBC or may bypass that SBC. That is, generally speaking, the signal stream for a call will always pass through an SBC, while the media stream for a call may or may not bypass that SBC.

Consider again the example above of an SBC that provides a protocol translation service to enable a call between two networks or devices that use different VoIP protocols. If the calling and called parties use the same VoIP protocol, the protocol translation service of the SBC is not needed. If no other SBC-implemented services or policies are needed, the media stream associated with the call may bypass the SBC, although the signal stream associated with the call will pass through the SBC.

In general, the practice in which the media stream bypasses an SBC is referred to as "VPN optimization" or "media optimization," and is generally referred to herein as "optimization." More specifically, in some embodiments, optimization means that an SBC does not modify the session description portion of the SIP, MGCP, H.323 or H.248 signaling to force RTP or RTCP traffic through the SBC when traffic remains within the VPN. As will be seen, it is also possible to perform optimization on certain subnets within a VPN, while not optimizing other subnets.

Figure 2A:
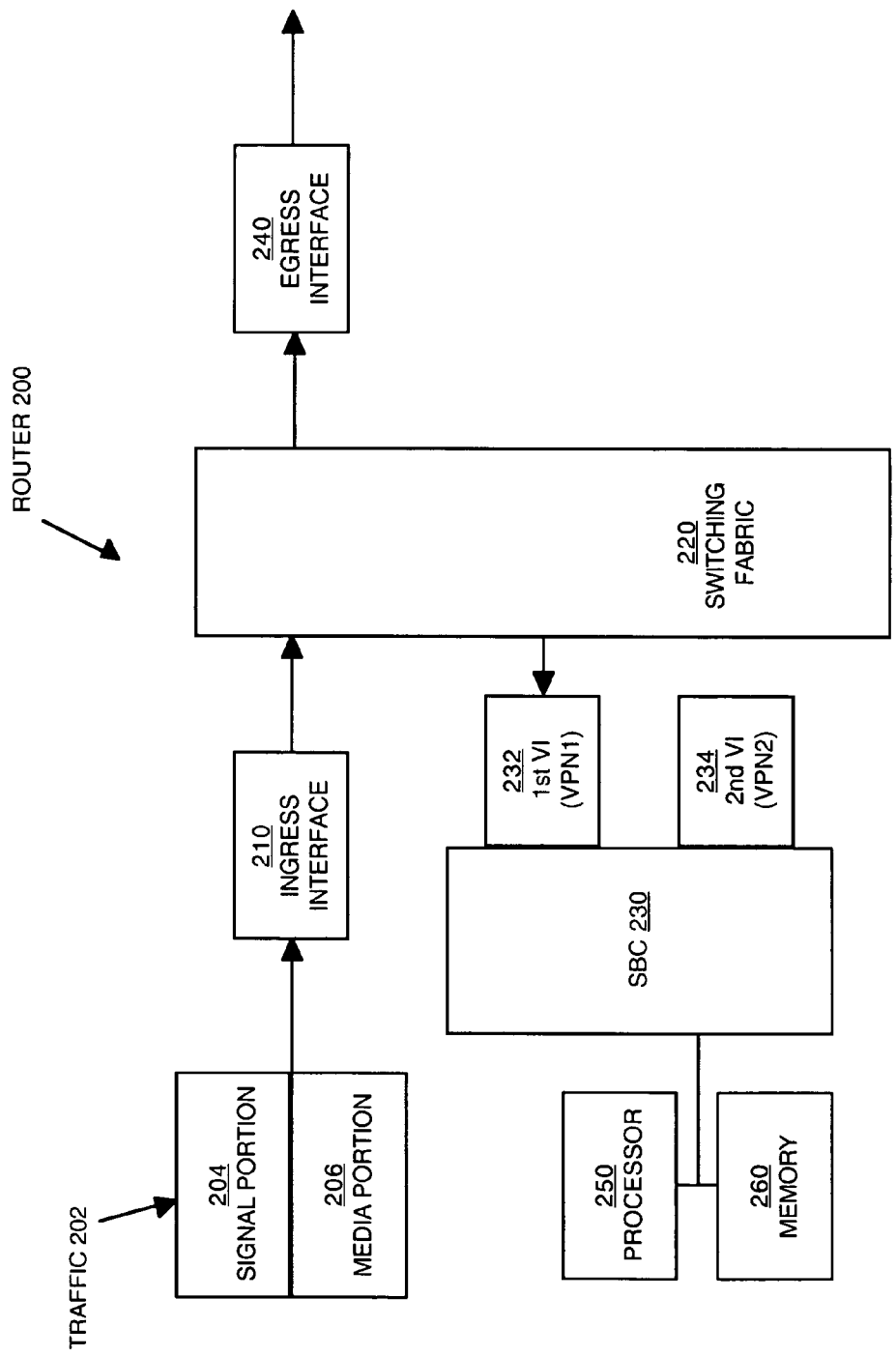
FIG. 2A is a block diagram of a network device according to one embodiment of the present invention.

FIG. 2A is a block diagram showing the flow of traffic through a network device (e.g., a router 200) according to one embodiment of the present invention. In the example of FIG. 2A, an SBC 230 is implemented on the router 200. As mentioned above, SBC 230 may instead be implemented on another device that is coupled to router 200, and SBC 230 may be implemented in hardware, in software, or in a combination of hardware and software.

According to embodiments of the present invention, SBC 230 is configured with a number of "virtual interfaces" (VIs) exemplified by a first VI 232 and a second VI 234. The VIs 232 and 234 may also be referred to as service virtual interfaces. Generally speaking, a virtual interface is a point on the communication path that receives and evaluates traffic. More generally, a virtual interface is an element that has, but is not limited to, the functionality described below.

In configuring the virtual interfaces, VI 232 is associated with a particular VPN (e.g., VPN1) and VI 234 is associated with another VPN (e.g., VPN2). As such, all traffic from VPN1 with destination prefixes assigned to VI 232 is directed to VI 232. Other VPN1 traffic with different destination prefixes is routed as usual, without passing through VI 232. Similarly, all traffic from VPN2 with destination prefixes assigned to VI 234 is directed to VI 234.

According to embodiments of the present invention, a virtual interface and VPN are associated with each other by associating a unique VPN identifier (ID) with the virtual interface. In one embodiment, the unique VPN identifier is a globally unique "VPN-ID" specified according to RFC 2685. In another embodiment, the unique VPN identifier is a "VRF-name" (the VPN routing and forwarding name used by routers). In yet another embodiment, both a VPN-ID and a VRF-name are used.

A VPN-ID is suitable (unique) for inter-autonomous system (AS) traffic as well as intra-AS traffic, while a VRF-name is suitable (unique) for intra-AS traffic. In general, an autonomous system is a collection of IP networks and routers, perhaps under the control of one entity (e.g., a carrier or an Internet service provider), that presents a common routing policy to the Internet. "Intra-AS" refers to, for example, traffic within a particular carrier or provider network, while "inter-AS" refers to, for example, traffic across carrier/provider networks.

Significantly, by using a unique VPN identifier (e.g., a VPN-ID and/or a VRF-name) to identify a VPN, and by configuring a virtual interface to automatically associate traffic that it receives with that unique VPN identifier, the mapping tables that are conventionally used to map VLAN tags to customer IDs can be eliminated. Furthermore, because call traffic 202 is separable into a signal stream 204 and a media stream 206, the VPN-ID can be embedded in the signal stream 204 and/or used by an external control protocol (e.g., a protocol based on ITU H.248) to eliminate mapping tables from both the media and the signaling blocks (e.g., in "softswitches").

In one embodiment, a virtual interface receives traffic from only a single VPN (one-to-one mapping of VPN to VI). In another embodiment, a virtual interface receives traffic from more than one VPN (many-to-one mapping of VPNs to VI). In the latter embodiment, a virtual interface can be configured to map a particular subset of destination prefixes or IP addresses (subnet) to a particular VPN. Accordingly, the virtual interface can distinguish traffic from one VPN versus traffic from another VPN by looking at, for example, the subnet associated with the incoming traffic. A VPN can receive traffic from any number of virtual interfaces.

With reference to FIGS. 1 and 2A, in one embodiment, call traffic 202 is received at an ingress interface 210 of the router 200. The source of the call traffic 202 may be device 118, and the destination may be device 128, for example.

In one embodiment, the router 200 performs a Layer 3 (L3) lookup based on information in the signal stream 204. "Layer 3" refers to the network layer of the well known OSI (Open System Interconnection) model. The L3 lookup identifies the appropriate virtual interface to which the call traffic 202 is to be directed. In the example of FIG. 2A, the call traffic 202 is being sent from device 118 in VPN1, and so the L3 lookup identifies VI 232 as the appropriate virtual interface. Accordingly, the call traffic 202 (specifically, the signal stream 204) is routed by switching fabric 220 to VI 232.

Continuing with reference to FIGS. 1 and 2A, once the signal stream 204 is routed to the appropriate virtual interface (VI 232 in the example of FIG. 2A), SBC 230 also examines OSI Layers 4-7 (other signaling information) arriving from VI 232 to identify the destination of the call traffic 202. Based on the signaling information, as well as the virtual interface and local policy on the SBC 230, the call traffic 202 is directed to an appropriate egress interface 240. In one embodiment, the SBC 230 embeds the VPN identifier (e.g., a VPN-ID and/or a VRF-name) associated with the VI 232 into the signaling information (e.g., in signal stream 204), and also may modify the signaling information according to the egress interface configuration.

To summarize, in one embodiment, an SBC 230 on (or coupled to) a router 200 is configured with virtual interfaces 232 and 234 that belong to VPN1 and VPN2, respectively. Each of the VIs 232 and 234 is configured with a unique VPN identifier such as a VPN-ID and/or a VRF-name. The SBC 230 automatically associates the virtual interfaces, which are unique to SBC 230, to the respective unique VPN identifiers, which are either unique within the network (in the case of VPN-IDs) or unique within an autonomous system (in the case of VRF-names). When traffic is routed to SBC 230 from a particular VPN, that traffic is routed to the particular virtual interface associated with that VPN, and in this manner the virtual interface uniquely identifies the VPN customer. Thus, SBC 230 is made VPN-aware without a mapping of VLAN tags to VPNs.

In one embodiment, SBC 230 embeds the unique VPN identifier in the signal stream 204 of the call traffic 202. In essence, the call traffic 202 is stamped with the unique VPN identifier. Consequently, other SBCs downstream of SBC 230, as well as other network elements—such as softswitches—downstream of SBC 230, are made aware of the VPN that is the source of the call traffic 202.

The unique VPN identifier can be embedded as a cookie in the signal portion 204. Other mechanisms can be utilized to include the unique VPN identifier in the call traffic 202. For example, the various signaling protocols, such as but not limited to SIP, ITU H.323, ITU H.248 and MGCP, include existing fields in the signal stream 204 that are available or can be modified to include the unique VPN identifier.

Figure 2B:
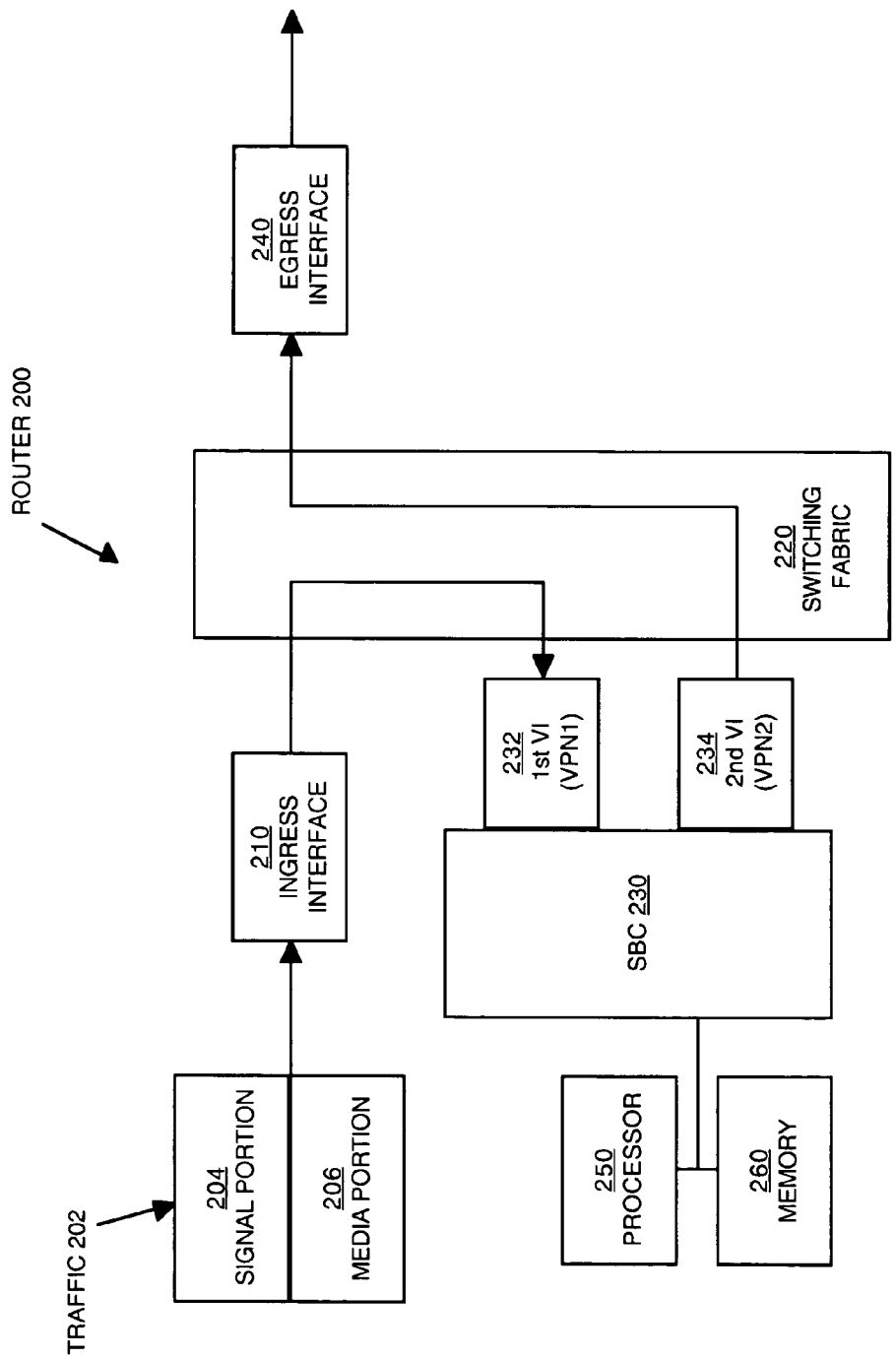
FIG. 2B illustrates an example of traffic flow through the network device of FIG. 2A.

FIG. 2B illustrates an example in which traffic goes from one VPN (e.g., VPN1) to another (e.g., VPN2). In this example, call traffic 202 arrives at VI 232 (which is associated with VPN1), is processed by the SBC 230, and is then directed to the appropriate egress interface 240 through VI 234 (which is associated with VPN2).

In one embodiment, SBC 230 performs an appropriate media-related service or implements an appropriate policy. In addition to the examples already mentioned herein, examples of media-related services include, but are not limited to, transcoding, network address translation (NAT), encryption, inter-VPN connectivity, and dual tone multi-frequency (DTMF) detection.

Figure 3A:
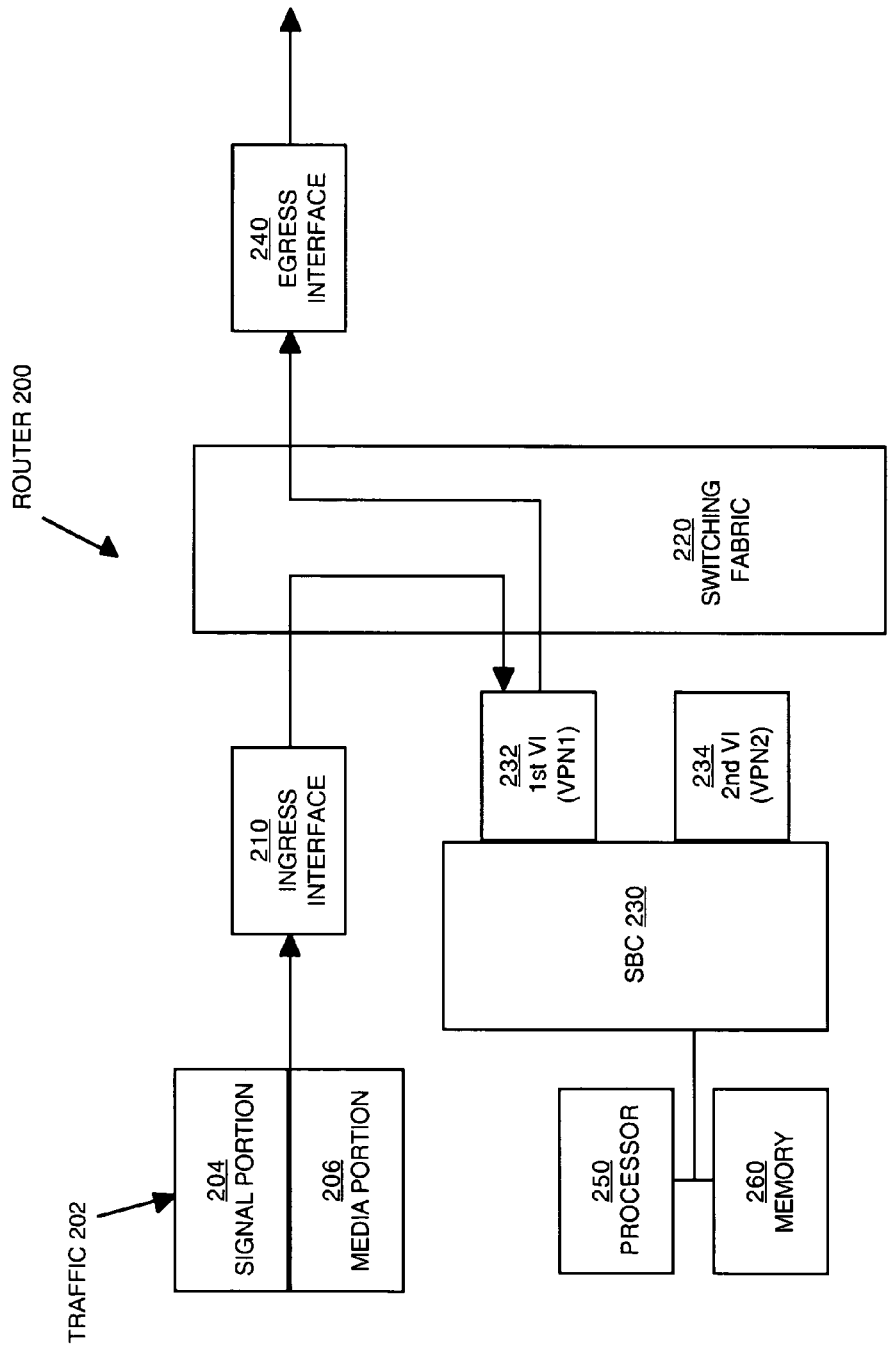
FIG. 3A illustrates another example of traffic flow through the network device of FIG. 2A.

FIG. 3A illustrates an example in which media or VPN optimization—in which media-related services may not be needed and where the media stream 206 may bypass the SBC 230—may be performed. In the present embodiment, VI 232 determines whether the source and destination of the call traffic 202 are in the same VPN. SBC 230 makes a decision to either force the media stream 206 through the SBC or to let the media stream 206 bypass the SBC (in either case, the signal stream 204 does not bypass the SBC).

In the example of FIG. 3A, VI 232 is associated with VPN1, which contains the source (device 118) of the call traffic 202. In one embodiment, if the destination of the call traffic 202 is also in VPN1 (that is, if device 128 is also in VPN1), then VPN/media optimization is performed. Specifically, in one embodiment, if the source and destination of the call traffic 202 (specifically, the signal stream 204) are both in VPN1 (VI 232), then VI 232 does not direct the traffic (specifically, the media stream 206) to SBC 230; instead, the traffic (specifically, the media stream 206) bypasses SBC 230. As mentioned above, in one embodiment, optimization means that SBC 230 does not modify the session description portion of the SIP, MGCP, H.323 or H.248 signaling to force RTP or RTCP traffic through the SBC when traffic remains within the VPN.

Continuing the example of FIG. 3A, in one embodiment, if the destination of call traffic 202 is not in VPN1, then VPN/media optimization is bypassed. Consequently, the media stream 206 is directed to SBC 230, which performs the appropriate media-related service or implements the appropriate policy, such as those mentioned previously herein.

Figure 3B:
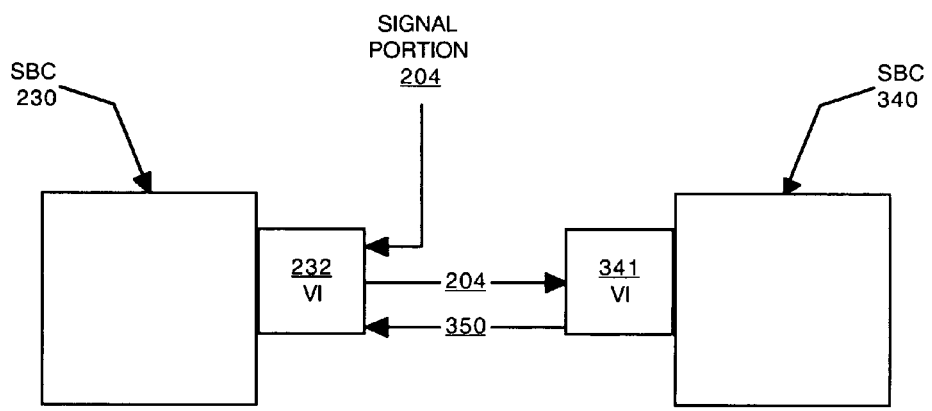
FIG. 3B is a block diagram showing the flow of signaling traffic between session border controllers according to one embodiment of the present invention.

FIG. 3B is a block diagram showing the flow of signaling traffic between two session border controllers 230 and 340 according to one embodiment of the present invention. The SBCs 230 and 340 may be on the same network device or on different devices.

As previously described herein, a virtual interface 232 is configured on SBC 230 and another virtual interface 341 is configured on SBC 340. In the present embodiment, signal stream 204 of call traffic 202 (FIG. 3A) is received at VI 232. In this embodiment, before SBC230 (VI 232) makes a decision with regard to VPN or media optimization, the unique VPN identifier associated with the source of the call traffic 202 is embedded in the signal stream 204, which is forwarded to VI 341. Thus, the signaling information is routed through the network to the correct destination and, once the connection is made, the media stream 206 commences (e.g., the caller begins to speak). In one embodiment, SBC 340 (VI 341) makes the decision with regard to whether or not optimization is to be performed, and communicates this decision to VI 232 using a signal 350.

Depending on the configured policies on SBC 230 and SBC 340, the media stream 206 can be controlled through modification of the signal stream 204 prior to initiation of the media stream 206. If VPN/media optimization is deemed to be required, then the media stream 206 bypasses both SBCs 230 and 340. However, if VPN/media optimization is not required, then the media stream 206 passes through one or both of the SBCs 230 and 340.

To summarize, if the source and destination of the call traffic are terminated on different SBCs that serve the same VPN, either of the SBCs can perform optimization. If the traffic traverses one or more entities (e.g., a softswitch or an SIP proxy) before reaching the downstream SBC (e.g., SBC 340), the unique VPN identifier embedded in the signal portion of the traffic will be passed through those entities so that the downstream SBC (e.g., SBC 340) can be made aware of the source of the call, can determine whether the source and destination are in the same VPN, and can make a decision with regard to optimization.

Figure 4:
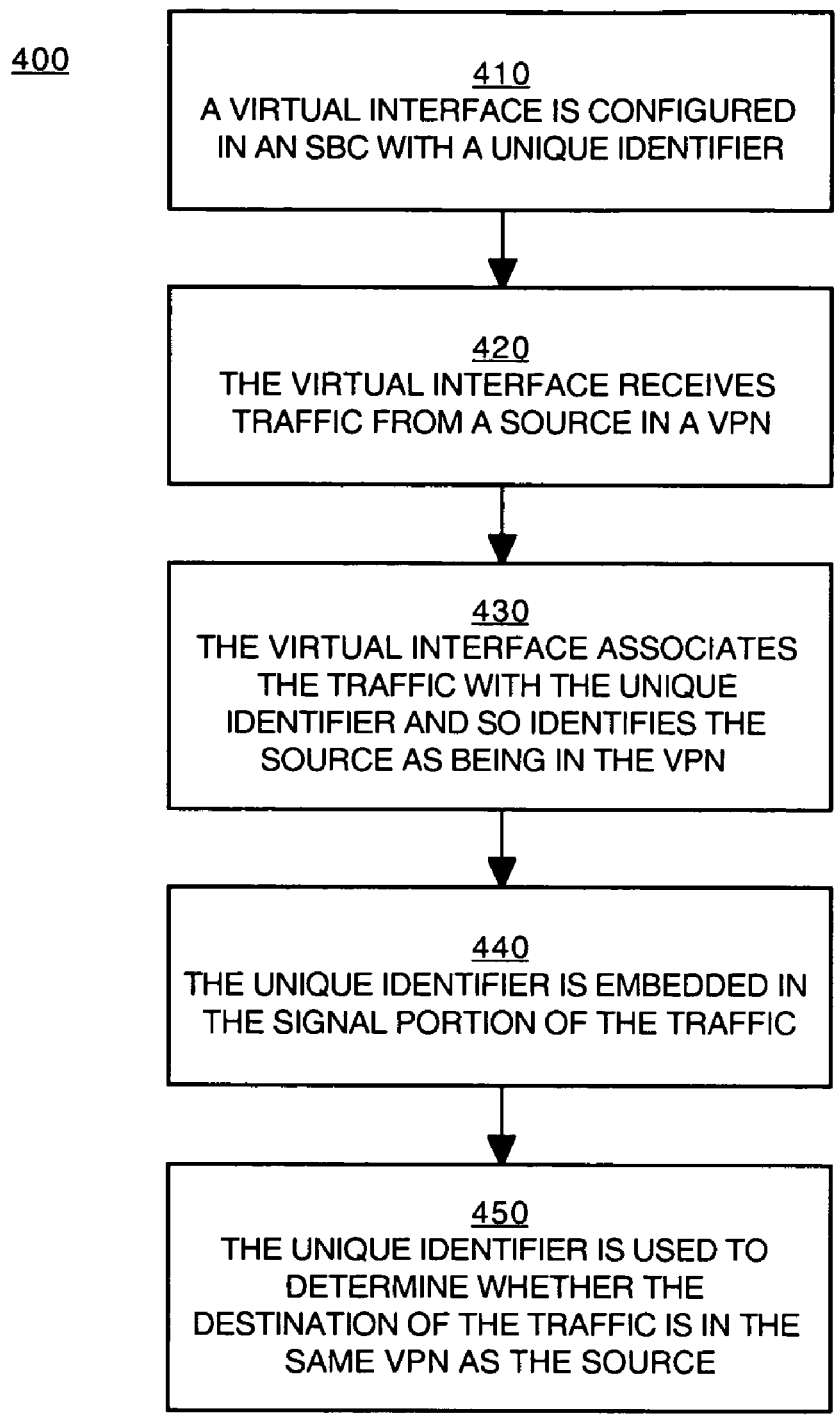
FIG. 4 is a flowchart of a method for managing traffic at a virtual interface of a session border controller according to an embodiment of the present invention.

FIG. 4 is a flowchart 400 of a method for managing traffic at a virtual interface of a session border controller according to an embodiment of the present invention. With reference to FIG. 2A, flowchart 400 can be implemented in one embodiment as software program instructions stored in a computer-readable memory unit 260 and executed by a central processor 250 in an intelligent network device or computer system (e.g., router 200). In one embodiment, the method of flowchart 400 is implemented by SBC 230 of FIG. 2A.

In block 410 of FIG. 4, in one embodiment, a virtual interface is configured in an SBC and is associated with a unique identifier. More specifically, the virtual interface is associated with a particular VPN and will receive all traffic from that VPN. Note this does not preclude traffic from that VPN being routed to other virtual interfaces, nor does it preclude traffic from other VPNs from being routed to the virtual interface. In the latter situation, the SBC is configured to distinguish traffic from one VPN versus traffic from another VPN. In one embodiment, the unique identifier is a VPN-ID per RFC 2685, and in another embodiment, the unique identifier is a VRF-name.

In block 420, the virtual interface receives traffic from a source in the VPN. In one embodiment, the traffic includes a signal portion and a media portion, where the signal portion and the media portion are separable. In another embodiment, the traffic is associated with a VoIP call.

In block 430, the virtual interface associates the traffic with the unique identifier. As such, the virtual interface identifies the source of the traffic as being in the VPN mentioned above in connection with block 410.

In block 440, in one embodiment, the unique identifier is embedded in the signal portion of the traffic. The signal portion of the instance of traffic can be forwarded to another network element, perhaps another SBC.

In block 450, the unique identifier is used to determine whether the source of the traffic and the destination of the traffic are in the same VPN. Depending on the result of this determination, and depending on the policy in place, the media portion of the traffic is either directed to the SBC or will bypass the SBC. As previously described herein, the decision on whether the SBC is bypassed or not may be made by a downstream SBC and communicated back to the upstream SBC.

Figure 5:
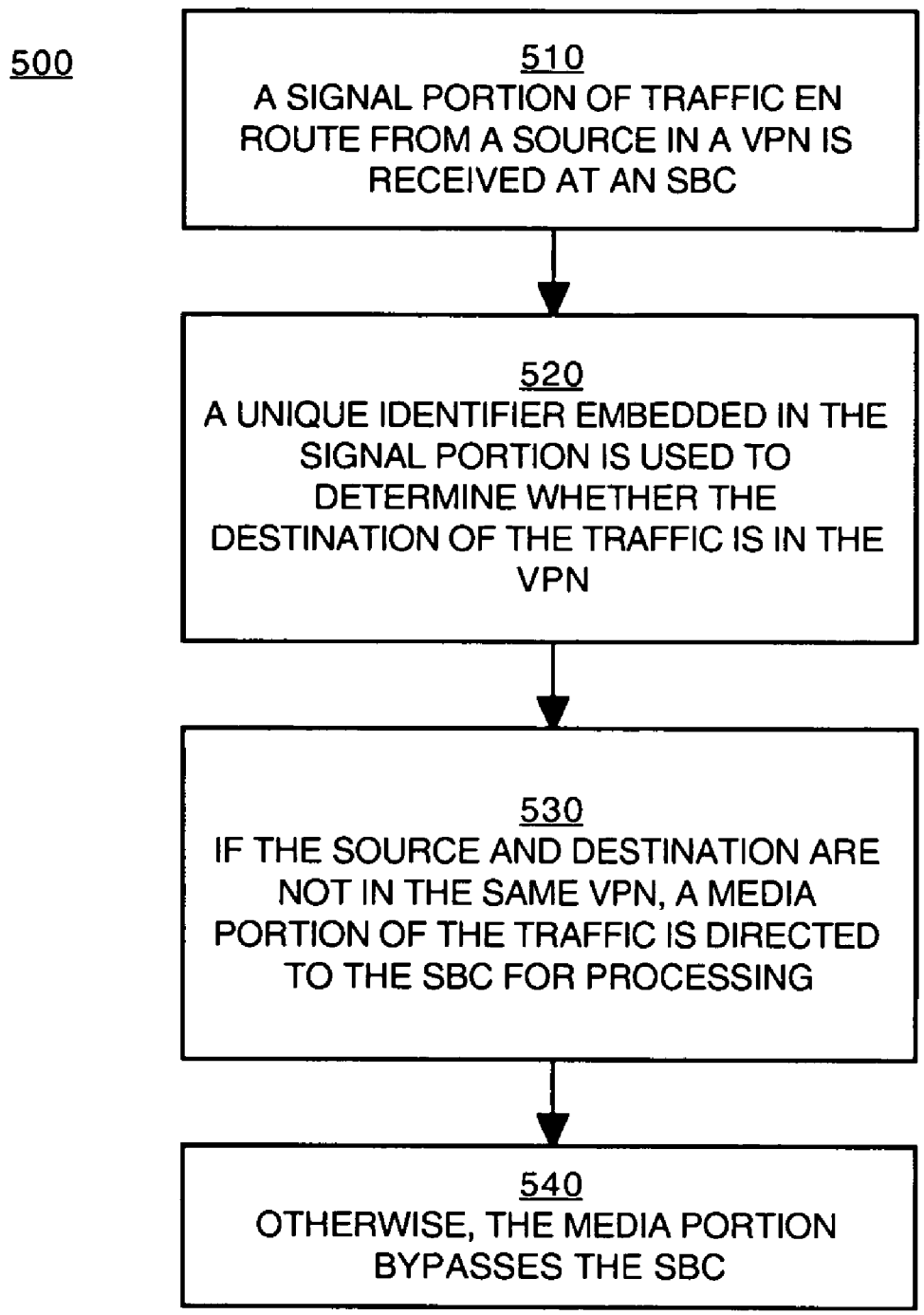
FIG. 5 is a flowchart of a method for managing traffic in a network according to an embodiment of the present invention.

FIG. 5 is a flowchart 500 of a method for managing traffic in a network according to an embodiment of the present invention. With reference to FIG. 3A, flowchart 500 can be implemented in one embodiment as software program instructions stored in a computer-readable memory unit 260 and executed by a central processor 250 in an intelligent network device or computer system (e.g., router 200). In one embodiment, the method of flowchart 500 is implemented by SBC 230 of FIGS. 3A and 3B; in another embodiment, the method of flowchart 500 is performed by SBC 340 of FIG. 3B.

In block 510 of FIG. 5, a signal portion of traffic is received at an SBC, and more specifically, at a virtual interface of the SBC. The traffic is en route from a source in a VPN to a destination. In one embodiment, a unique identifier associated with the VPN is embedded in the signal portion.

In block 520, the unique identifier provided in the signal portion is used to determine whether the source and destination of the VPN are in the same VPN.

In block 530, in one embodiment, the media portion of the instance of traffic is directed to the SBC if the destination is not in the same VPN as the source.

In block 540, in one embodiment, the media portion bypasses the SBC if the destination is in the same VPN as the source.

Returning to block 520, as mentioned above, the determination as to whether the source and destination are in the same VPN can be made by one SBC and communicated to another SBC. Likewise, either of the SBCs may receive the media portion for processing.

Although specific steps are disclosed in flowcharts 400 and 500 of FIGS. 4 and 5, respectively, such steps are exemplary. That is, embodiments of the present invention are well suited to performing various other (additional) steps or variations of the steps recited in flowcharts 400 and 500. The steps in flowcharts 400 and 500 may be performed in an order different than presented, and not all of the steps in flowcharts 400 and 500 may be performed.

In summary, embodiments in accordance with the present invention provide a friendly solution for configuring SBCs so that the SBCs are made VPN-aware without the complication and overhead of mapping tables.

Embodiments of the present invention are thus described. While the present invention has been described in particular embodiments, it should be appreciated that the present invention should not be construed as limited by such embodiments, but rather construed according to the below claims.

What is claimed is:

1. A method comprising:
   associating a virtual private network (VPN) corresponding with a source of a call to a virtual interface of a Session Border Controller (SBC), wherein the association is performed using a VPN identifier, and wherein the virtual interface is configured to receive the call and to evaluate the call routed to the SBC;
   configuring the SBC with policies to facilitate communication between the VPN identified with the VPN identifier and another VPN identified with another VPN identifier different from the VPN identifier;
   receiving the call at the virtual interface of the SBC;
   separating the call into a signal portion and a media portion;
   embedding the VPN identifier in the signal portion of the call; and
   routing the signal portion of the call through the SBC and determining if the source of the call and a destination of the call are in a same or different VPN based on the VPN identifier embedded in the signal portion of the call and the association of the VPN to the virtual interface;
   wherein if the SBC determines that the source and destination are within a same VPN, then the media portion is not routed through the SBC, else if the SBC determines that the source and destination are not within the same VPN, then routing the media portion through the SBC;
   wherein the routing of the media portion through the SBC comprises processing the media portion using the policies implemented by the SBC, and routing the media portion to the destination of the call.

2. The method of claim 1 further comprising:
   forwarding the signal portion including the VPN identifier to a second SBC; and
   receiving a notification message from the second SBC indicating whether or not the source and the destination of the call are in a same VPN associated with the second SBC.

3. The method of claim 2 wherein if the source and the destination of the call are in the same VPN as the second SBC, then routing the media portion of the call around the second SBC.

4. The method of claim 1 wherein if the source and the destination of the call are in the same VPN then routing the media portion of the call around one or more network elements.

5. The method of claim 1 wherein associating the VPN to the virtual interface for receiving the call is performed independent of a mapping table.

6. The method of claim 1 wherein the VPN identifier comprises an intra-autonomous system identifier that is unique only within a carrier network.

7. The method of claim 1 wherein the VPN identifier comprises an inter-autonomous system identifier that is unique across multiple carrier networks.

8. A non-transitory computer-usable medium having computer-readable program code embodied therein for causing a device to execute a method for routing a call, the method comprising:
   associating a virtual private network (VPN) corresponding with a source of a call to a virtual interface of a Session Border Controller (SBC), wherein the association is performed using a VPN identifier, and wherein the virtual interface is configured to receive the call and to evaluate the call routed to the SBC;
   configuring the SBC with policies to facilitate communication between the VPN identified with the VPN identifier and another VPN identified with another VPN identifier different from the VPN identifier;
   receiving the call at the virtual interface of the SBC, wherein the SBC is for providing media-related services or implementing a network policy, or combinations thereof, associated with the call;
   separating the call into a signal portion and a media portion; and
   embedding the VPN identifier in the signal portion; and
   routing the signal portion of the call through the SBC and determining if the source of the call and a destination of the call are in a same or different VPN based on the VPN identifier embedded in the signal portion of the call and the association of the VPN to the virtual interface wherein if the source and destination are in a same VPN then routing the media portion of the call around the SBC;
   wherein routing of the media portion through the SBC comprises processing the media portion using the policies implemented within the SBC, and routing the media portion to the destination of the call.

9. The method of claim 8 wherein if the source and the destination of the call are not in the same VPN then routing the media portion of the call through the SBC.

10. A system comprising:
    means for associating a virtual private network (VPN) corresponding with a source of a call to a virtual interface of a Session Border Controller (SBC), wherein the association is performed using a VPN identifier, and wherein the virtual interface is configured to receive the call and to evaluate the call routed to the SBC;
    means for configuring the SBC with policies to facilitate communication between the VPN identified with the VPN identifier and another VPN identified with another VPN identifier different from the VPN identifier;
    means for receiving the call at the virtual interface of the SBC;
    means for separating the call into a signal portion and a media portion;
    means for embedding the VPN identifier in the signal portion of the call; and
    means for routing the signal portion of the call through the SBC and determining if the source of the call and a destination of the call are in a same or different VPN based on the VPN identifier embedded in the signal portion of the call and the association of the VPN to the virtual interface wherein if the source and destination are in the same VPN then routing the media portion of the call around the SBC, else routing the media portion through the SBC;
    wherein routing of the media portion through the SBC comprises processing the media portion using the policies implemented within the SBC, and routing the media portion to the destination of the call.

11. The system of claim 10 wherein if the source and the destination of the call are not in the same VPN then routing the media portion of the call through the SBC.

12. The system of claim 10 wherein the VPN identifier is selected from a plurality of unique identifiers each corresponding to a different VPN.

13. A device comprising:
   a plurality of communication interfaces;
   one or more processors coupled to the interfaces; and
   a memory unit coupled to the one or more processors, the memory unit containing instructions that when executed implement a computer-implemented method for routing a call at a virtual interface of a session border controller (SBC) executable on the device, the method comprising:
   associating a virtual private network (VPN) corresponding with a source of the call to the virtual interface of the SBC, wherein the association is performed using a VPN identifier, and wherein the virtual interface is configured to receive the call and to evaluate the call routed to the SBC;
   configuring the SBC with policies to facilitate communication between the VPN identified with the VPN identifier and another VPN identified with another VPN identifier different from the VPN identifier;
   receiving the call at the virtual interface of the SBC;
   separating the call into a signal portion and a media portion;
   embedding the VPN identifier in a signal portion of the call; and
   routing the signal portion of the call through the SBC and determining if the source of the call and a destination of the call are in a same or different VPN based on the VPN identifier embedded in the signal portion of the call and the association of the VPN to the virtual interface wherein if the source and destination are in the same VPN then routing the media portion of the call around the SBC, else routing the media portion through the SBC;
   wherein the routing of the media portion through the SBC comprises processing the media portion using the policies implemented within the SBC, and routing the media portion to the destination of the call.

14. The device of claim 13 wherein if the source and the destination of the call are not in the same VPN then routing the media portion of the call through the SBC.

15. The device of claim 13 wherein the VPN identifier is selected from a plurality of VPN identifiers each corresponding to a different VPN.

* * * * *